US011986821B2

(12) United States Patent
Shen et al.

(10) Patent No.: US 11,986,821 B2
(45) Date of Patent: May 21, 2024

(54) DETECTION CHIP

(71) Applicants: BEIJING BOE HEALTH TECHNOLOGY CO., LTD., Beijing (CN); BOE TECHNOLOGY GROUP CO., LTD., Beijing (CN)

(72) Inventors: Xiaohe Shen, Beijing (CN); Chungen Yuan, Beijing (CN); Haochen Cui, Beijing (CN); Lijiao Hu, Beijing (CN); Tao Hu, Beijing (CN); Jing Li, Beijing (CN); Weiqiong Gan, Beijing (CN)

(73) Assignees: BEIJING BOE HEALTH TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 909 days.

(21) Appl. No.: 17/041,544

(22) PCT Filed: Nov. 13, 2019

(86) PCT No.: PCT/CN2019/118077
§ 371 (c)(1),
(2) Date: Sep. 25, 2020

(87) PCT Pub. No.: WO2021/092801
PCT Pub. Date: May 20, 2021

(65) Prior Publication Data

US 2023/0022752 A1 Jan. 26, 2023

(51) Int. Cl.
*B01L 3/00* (2006.01)

(52) U.S. Cl.
CPC ... *B01L 3/502753* (2013.01); *B01L 2300/048* (2013.01); *B01L 2300/0681* (2013.01);
(Continued)

(58) Field of Classification Search
CPC ......... B01L 3/502753; B01L 2300/048; B01L 2300/0681; B01L 2300/0816;
(Continued)

(56) References Cited

U.S. PATENT DOCUMENTS

2006/0228259 A1 10/2006 Samsoondar
2008/0153152 A1 6/2008 Wakabayashi et al.
(Continued)

FOREIGN PATENT DOCUMENTS

CN 205650213 U 10/2016
CN 206052034 U 3/2017
(Continued)

OTHER PUBLICATIONS

Extended European Search Report from European Patent Application No. 19945453.9 dated Nov. 21, 2022.

*Primary Examiner* — Benjamin R Whatley
(74) *Attorney, Agent, or Firm* — Dilworth & Barrese, LLP.; Michael J. Musella, Esq.

(57) ABSTRACT

A detection chip is disclosed. The detection chip includes a sample injection structure, a filter structure, and a reaction structure which are sequentially connected. The filter structure includes a first main body, and a first inlet portion and a first outlet portion respectively on two sides of the first main body. A width of the first inlet portion gradually decreases in a direction away from the first main body, and a width of the first outlet portion gradually decreases in a direction away from the first main body.

16 Claims, 6 Drawing Sheets

(52) U.S. Cl.
CPC .................. *B01L 2300/0816* (2013.01); *B01L 2300/0819* (2013.01); *B01L 2300/087* (2013.01); *B01L 2300/0877* (2013.01)

(58) Field of Classification Search
CPC ....... B01L 2300/0819; B01L 2300/087; B01L 2300/0877
See application file for complete search history.

(56) References Cited

U.S. PATENT DOCUMENTS

| | | | | |
|---|---|---|---|---|
| 2016/0090588 | A1* | 3/2016 | Lofquist | C12N 15/1017 435/297.5 |
| 2017/0107507 | A1* | 4/2017 | Lee | C12N 15/101 |
| 2019/0046897 | A1 | 2/2019 | Richardson | |
| 2019/0160813 | A1* | 5/2019 | Foresti | B33Y 10/00 |
| 2020/0156069 | A1* | 5/2020 | Weber | B01L 3/502707 |
| 2020/0406263 | A1 | 12/2020 | Milgram et al. | |

FOREIGN PATENT DOCUMENTS

| | | | |
|---|---|---|---|
| CN | 106754240 | A | 5/2017 |
| WO | 2019122788 | A1 | 6/2019 |

* cited by examiner

DETECTION CHIP

TECHNICAL FIELD

Embodiments of the present disclosure relate to a detection chip.

BACKGROUND

Microfluidic chip technology integrates basic operation units related to sample preparation, reaction, separation, detection, and the like in the fields of biology, chemistry, medicine, and the like into a chip with a micrometer-scale micro-channel, and automatically completes the entire process of reaction and analysis. The chip used in this process is referred to as a microfluidic chip, and may also be referred to as a lab-on-a-chip. The microfluidic chip technology has advantages of small sample consumption, fast analysis speed, being easy to be made into portable instruments, being suitable for real-time and on-site analysis, etc., and has been widely used in various fields such as biology, chemistry, medicine, etc.

SUMMARY

At least one embodiment of the present disclosure provides a detection chip, the detection chip comprises a sample injection structure, a filter structure, and a reaction structure which are sequentially connected, in which the filter structure comprises a first main body, and a first inlet portion and a first outlet portion respectively on two sides of the first main body, a width of the first inlet portion gradually decreases in a direction away from the first main body, and a width of the first outlet portion gradually decreases in a direction away from the first main body.

For example, in the detection chip provided by at least one embodiment of the present disclosure, a height of the filter structure ranges from 0.2 mm to 1.5 mm, and a maximum width of the first main body ranges from 6 mm to 15 mm.

For example, in the detection chip provided by at least one embodiment of the present disclosure, a planar shape of the first main body comprises an arc-shaped edge, a planar shape of the first inlet portion is an isosceles triangle, and the first inlet portion has an inlet at an apex of the isosceles triangle.

For example, in the detection chip provided by at least one embodiment of the present disclosure, an apex angle of the isosceles triangle ranges from 45° to 120°.

For example, in the detection chip provided by at least one embodiment of the present disclosure, a planar shape of the first outlet portion is a polygon, and the first outlet portion has an outlet at a corner of the polygon.

For example, the detection chip provided by at least one embodiment of the present disclosure further comprises a mixing structure, in which the mixing structure is connected between the sample injection structure and the filter structure.

For example, in the detection chip provided by at least one embodiment of the present disclosure, the filter structure further comprises a groove at the first inlet portion, and a height of the groove is greater than a height of the filter structure by 0.2 mm to 1 mm.

For example, in the detection chip provided by at least one embodiment of the present disclosure, a width of the groove ranges from 1.5 mm to 5 mm, and a distance between an edge of the groove and an edge of the filter structure ranges from 1 mm to 3 mm.

For example, the detection chip provided by at least one embodiment of the present disclosure further comprises a first flow channel, in which the mixing structure is connected to the groove through the first flow channel.

For example, in the detection chip provided by at least one embodiment of the present disclosure, the first flow channel comprises a first portion and a second portion, the first portion extends into the first inlet portion of the filter structure to be connected to the groove, the second portion is between the mixing structure and the filter structure, and a height of the first portion is greater than a height of the second portion.

For example, in the detection chip provided by at least one embodiment of the present disclosure, the height of the first portion ranges from 0.5 mm to 1.5 mm, and a width of the first portion ranges from 0.2 mm to 1 mm; and the height of the second portion ranges from 0.2 mm to 1 mm, and a width of the second portion ranges from 0.2 mm to 1 mm.

For example, in the detection chip provided by at least one embodiment of the present disclosure, the height of the groove is identical to the height of the first portion.

For example, in the detection chip provided by at least one embodiment of the present disclosure, the mixing structure comprises a second main body, and a second inlet portion and a second outlet portion respectively on two sides of the second main body, a width of the second inlet portion gradually decreases in a direction away from the second main body, and a width of the second outlet portion gradually decreases in a direction away from the second main body.

For example, in the detection chip provided by at least one embodiment of the present disclosure, a height of the mixing structure ranges from 0.5 mm to 2 mm, a length of the mixing structure ranges from 5 mm to 25 mm, and a width of the mixing structure ranges from 1.5 mm to 5.5 mm.

For example, in the detection chip provided by at least one embodiment of the present disclosure, the height of the mixing structure is greater than the height of the second portion of the first flow channel.

For example, the detection chip provided by at least one embodiment of the present disclosure further comprises a filter film, in which the filter film is in the filter structure, the filter film is in a compressed state in a thickness direction, and a compression amount ranges from 10% to 40%.

For example, in the detection chip provided by at least one embodiment of the present disclosure, a height of the sample injection structure ranges from 5 mm to 15 mm, and a diameter of the sample injection structure ranges from 5 mm to 15 mm.

For example, the detection chip provided by at least one embodiment of the present disclosure further comprises a second flow channel connecting the sample injection structure to the mixing structure, in which a height of the second flow channel ranges from 0.2 mm to 1 mm, and a width of the second flow channel ranges from 0.2 mm to 1 mm.

For example, in the detection chip provided by at least one embodiment of the present disclosure, the reaction structure comprises a plurality of reaction units, each of the plurality of reaction units comprises a cylindrical cavity, a diameter of the cylindrical cavity ranges from 0.5 mm to 3 mm, and a height of the cylindrical cavity ranges from 0.5 mm to 5 mm.

For example, the detection chip provided by at least one embodiment of the present disclosure further comprises a third flow channel connecting the filter structure to the reaction structure, a height of the third flow channel ranges from 0.2 mm to 1 mm, and a width of the third flow channel ranges from 0.2 mm to 1 mm.

For example, in the detection chip provided by at least one embodiment of the present disclosure, the reaction structure comprises a fourth flow channel, the fourth flow channel comprises a fourth main flow channel and a plurality of fourth sub-flow channels connected to at least one side of the fourth main flow channel, the plurality of fourth sub-flow channels are connected to the plurality of reaction units, respectively, and the third flow channel is connected to the fourth main flow channel.

For example, in the detection chip provided by at least one embodiment of the present disclosure, an extending direction of the fourth main flow channel is perpendicular to an extending direction of the third flow channel, and the third flow channel is connected to a middle portion of the fourth main flow channel.

For example, the detection chip provided by at least one embodiment of the present disclosure further comprises a cover plate and an air-exhaust liquid-barrier film, in which the cover plate at least covers the reaction structure, and the air-exhaust liquid-barrier film is between the reaction structure and the cover plate, and comprises through holes at least exposing a plurality of reaction units.

BRIEF DESCRIPTION OF THE DRAWINGS

In order to clearly illustrate the technical solution of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

Figure 1:
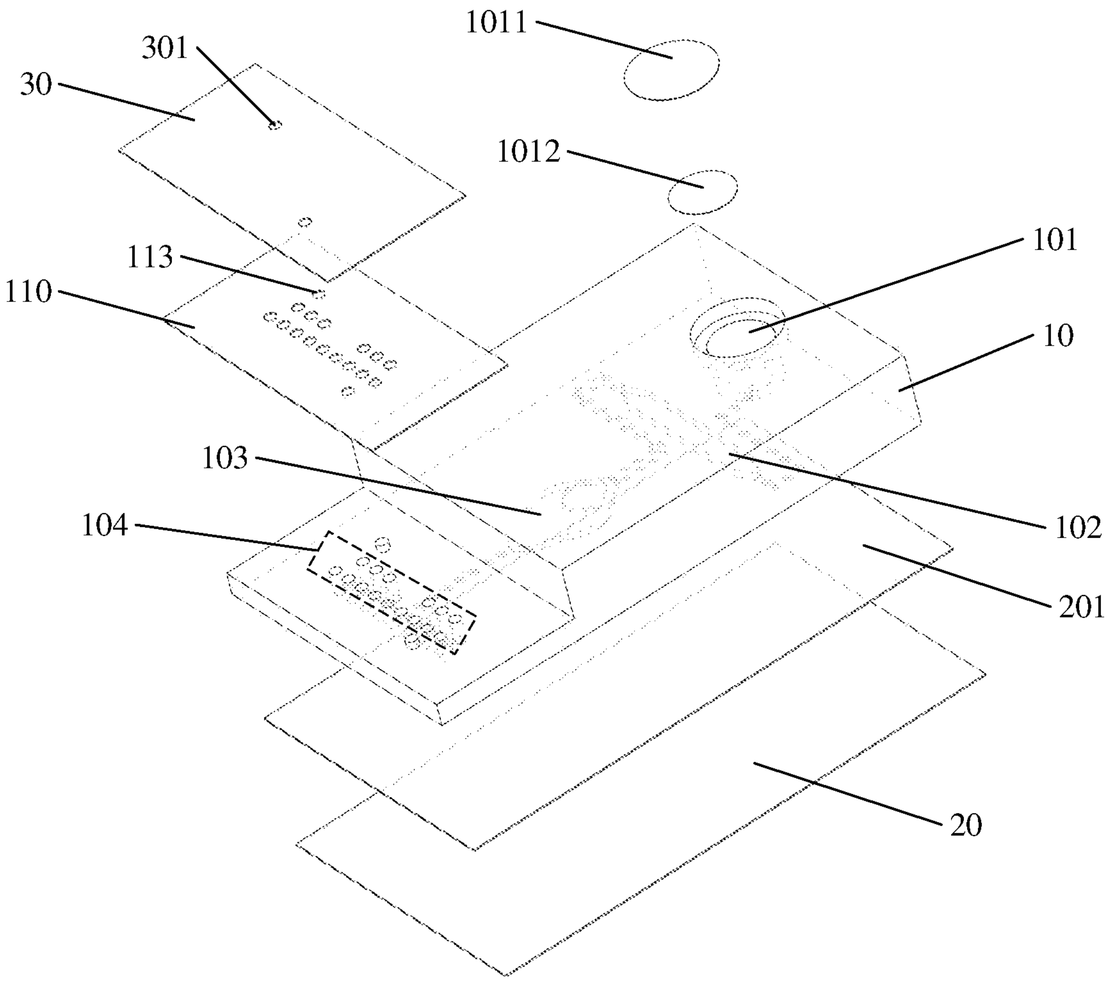
FIG. 1 is an exploded view of a detection chip provided by at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", "coupled", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In the design process of the microfluidic chip, it is usually desirable to integrate various functions of analysis and detection on the chip to reduce the dependence on external operations, thereby achieving automation and integration. For example, the sample injection component, the mixing component, the filter component, and the analysis and detection component of the microfluidic chip may be integrated to achieve the automation of the detection process. In the detection process of the microfluidic chip, the sample is first injected into the sample injection component, and then the sample and the detection reagent (or diluent, or other reagents which allow the sample to be more suitable for detection) are thoroughly mixed in the mixing component and then filtered for the next detection operation. The mixing operation of the sample may improve the uniformity of the sample, the filtering operation of the sample may improve the purity of the sample, and these operations have important effects on the detection process and the detection result of the microfluidic chip.

At least one embodiment of the present disclosure provides a detection chip, and the detection chip includes a sample injection structure, a filter structure, and a reaction structure which are sequentially connected. The filter structure includes a first main body, and a first inlet portion and a first outlet portion respectively on two sides of the first main body. A width of the first inlet portion gradually decreases in a direction away from the first main body, and a width of the first outlet portion gradually decreases in a direction away from the first main body.

The filter structure of the detection chip provided by the above embodiments of the present disclosure can filter the injected sample to be detected in a lateral flow filtering manner, thereby having a better filtering effect and facilitating achieving the thinness of the overall appearance of the detection chip. In addition, based on the above-mentioned structure design of the filter structure, the filter structure can fully achieve the filtering function, improve the filtering efficiency, and prevent the occurrence of undesirable phenomena such as sample leakage at the edge of the filter structure.

Hereinafter, the detection chip provided by the present disclosure is described through some specific embodiments.

At least one embodiment of the present disclosure provides a detection chip, and FIG. 1 illustrates an exploded view of the detection chip. As illustrated in FIG. 1, the detection chip includes a sample injection structure 101, a filter structure 103, and a reaction structure 104 which are sequentially connected. For example, the sample injection structure 101 is used for injecting the sample to be detected, the filter structure 103 is used for filtering the sample to be detected, and the reaction structure 104 is used for enabling the sample, to be detected, to be detected. For example, the reaction structure 104 may be pre-provided with the reaction reagent, and the sample to be detected may react with the reaction reagent as required, so as to be suitable for subsequent detection operations. The detection operations may be optical detection or the like according to requirements, and the embodiments of the present disclosure are not limited in this aspect. For example, the detection chip is a microfluidic chip, and can be used for detection of blood, body fluid and other samples.

For example, in some embodiments, as illustrated in FIG. 1, the detection chip further includes an upper substrate 10, a lower substrate 20, and a cover plate 30. For example, in some examples, the sample injection structure 101, the filter structure 103, and the reaction structure 104 are all formed on the upper substrate 10, and the cover plate 30 at least covers the reaction structure 104 (as the case illustrated in FIG. 1). In other examples, the arrangement of the sample injection structure 101, the filter structure 103, and the reaction structure 104 may also adopt other forms (described later), and the embodiments of the present disclosure are not limited in this aspect.

For example, in the example illustrated in FIG. 1, the overall outline of the detection chip is in a rectangle shape. For example, the length of the rectangle shape may range from 25 mm to 50 mm, such as 30 mm, 35 mm, 40 mm, or the like, and the width of the rectangle shape may range from 15 mm to 35 mm, such as 20 mm, 25 mm, 30 mm, or the like. For example, the upper substrate 10 and its internal structures (i.e., the sample injection structure 101, the filter structure 103, the reaction structure 104, etc.) may be formed in one step by injection molding, thereby simplifying the manufacturing process. In other examples, the overall outline of the detection chip may also have other shapes, such as a circle shape, an ellipse shape, or other polygon shapes, and the embodiments of the present disclosure are not limited in this aspect.

Figure 2:
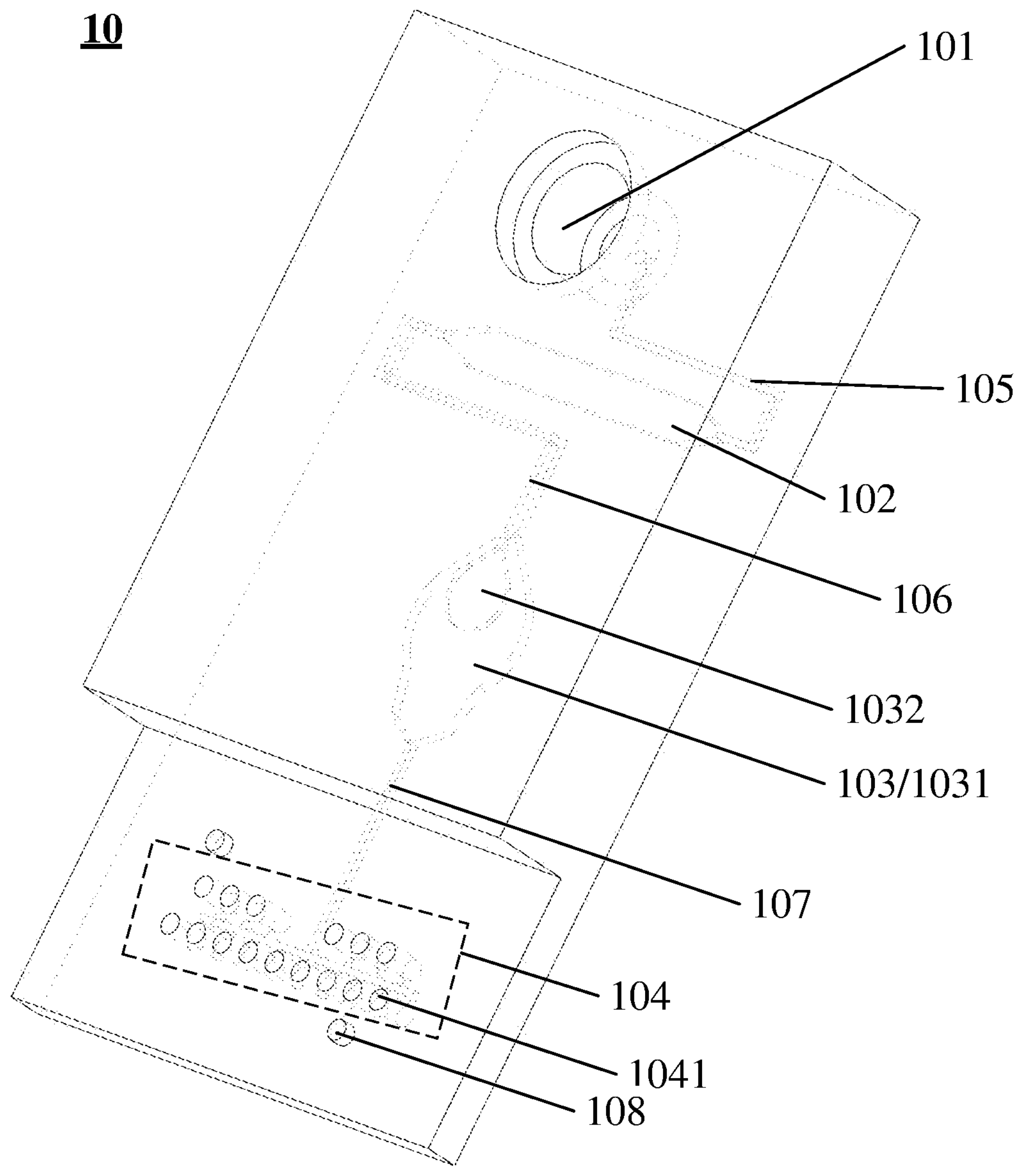
FIG. 2 is a stereoscopic perspective view of an upper substrate of a detection chip provided by at least one embodiment of the present disclosure.
Figure 3:
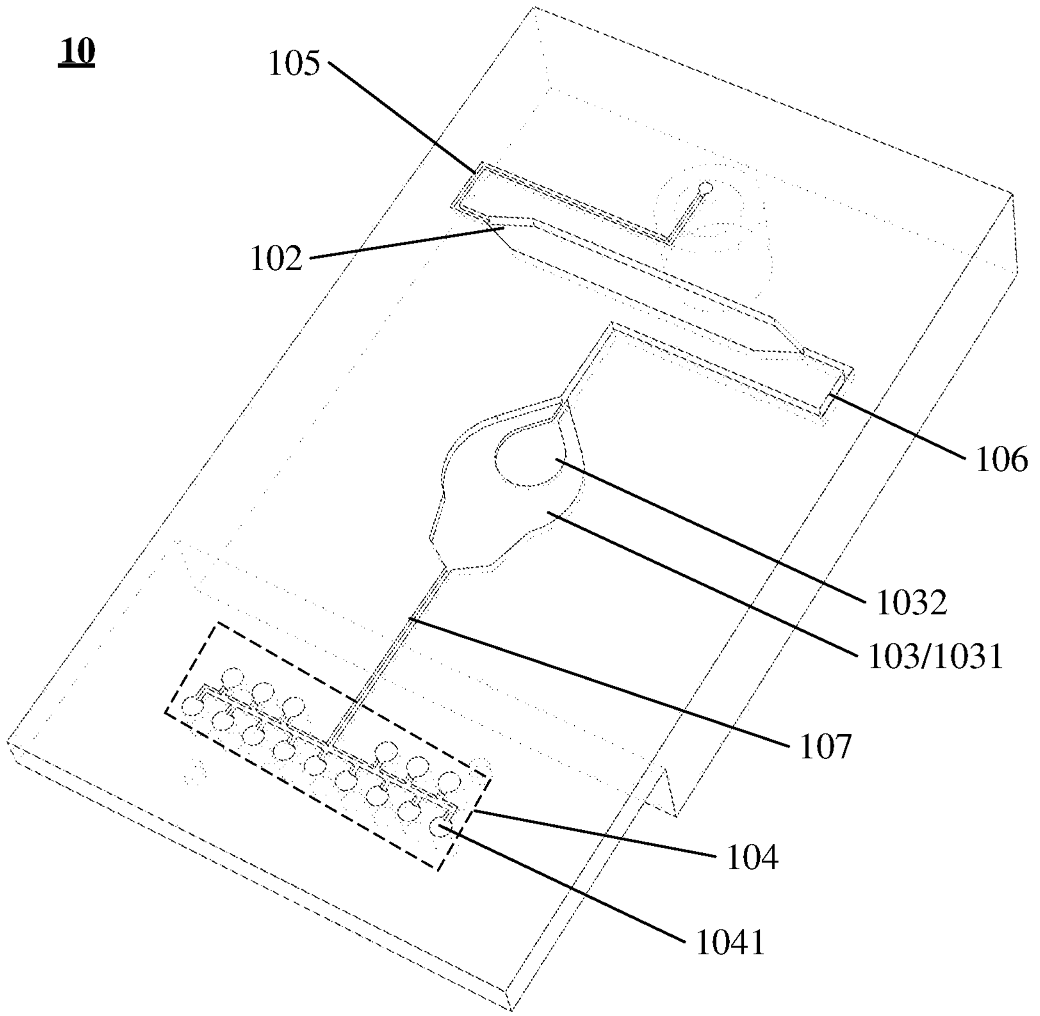
FIG. 3 is another stereoscopic perspective view of an upper substrate of a detection chip provided by at least one embodiment of the present disclosure.
Figure 4:
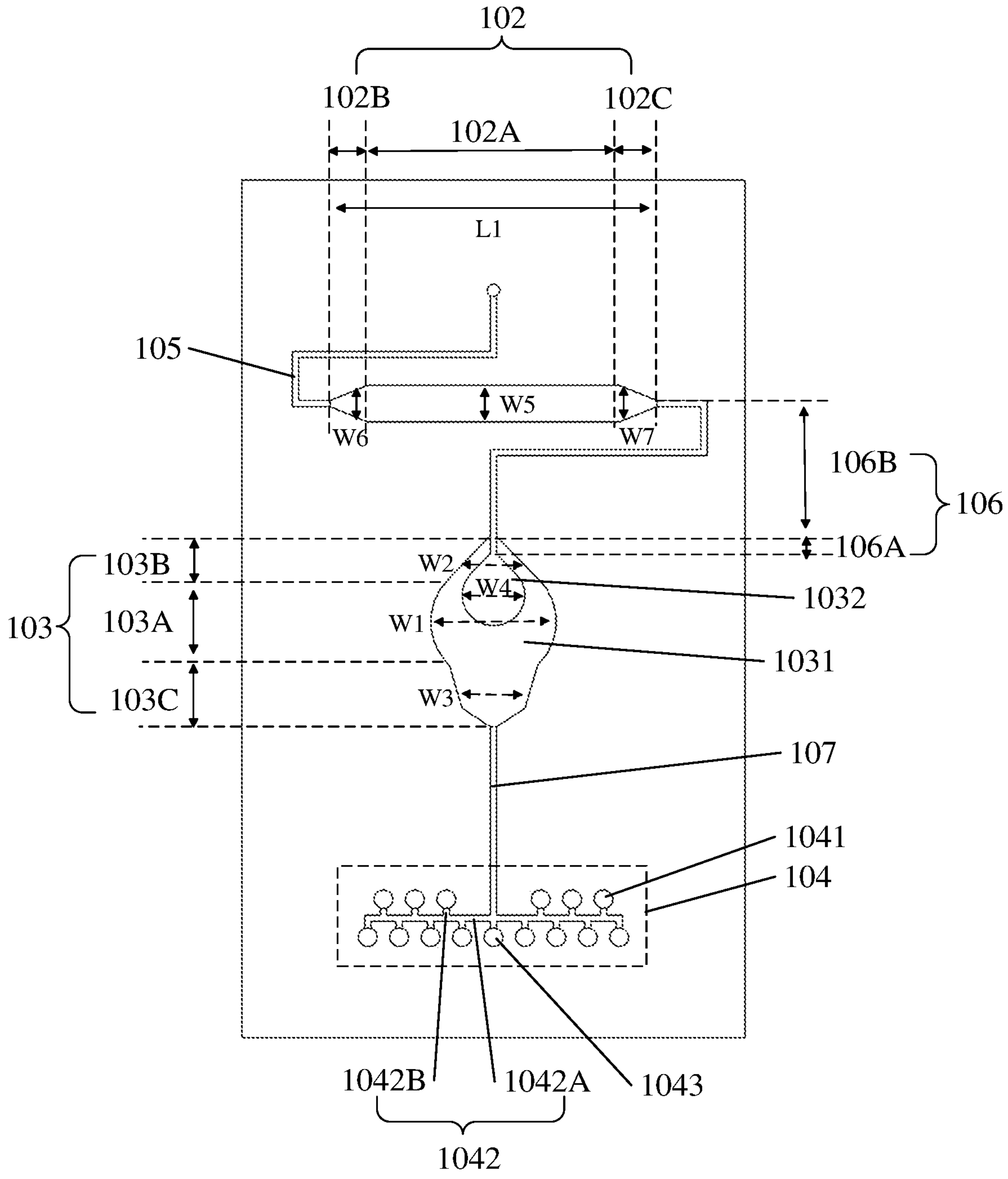
FIG. 4 is a schematic planar view of a lower surface of an upper substrate of a detection chip provided by at least one embodiment of the present disclosure.
Figure 5:
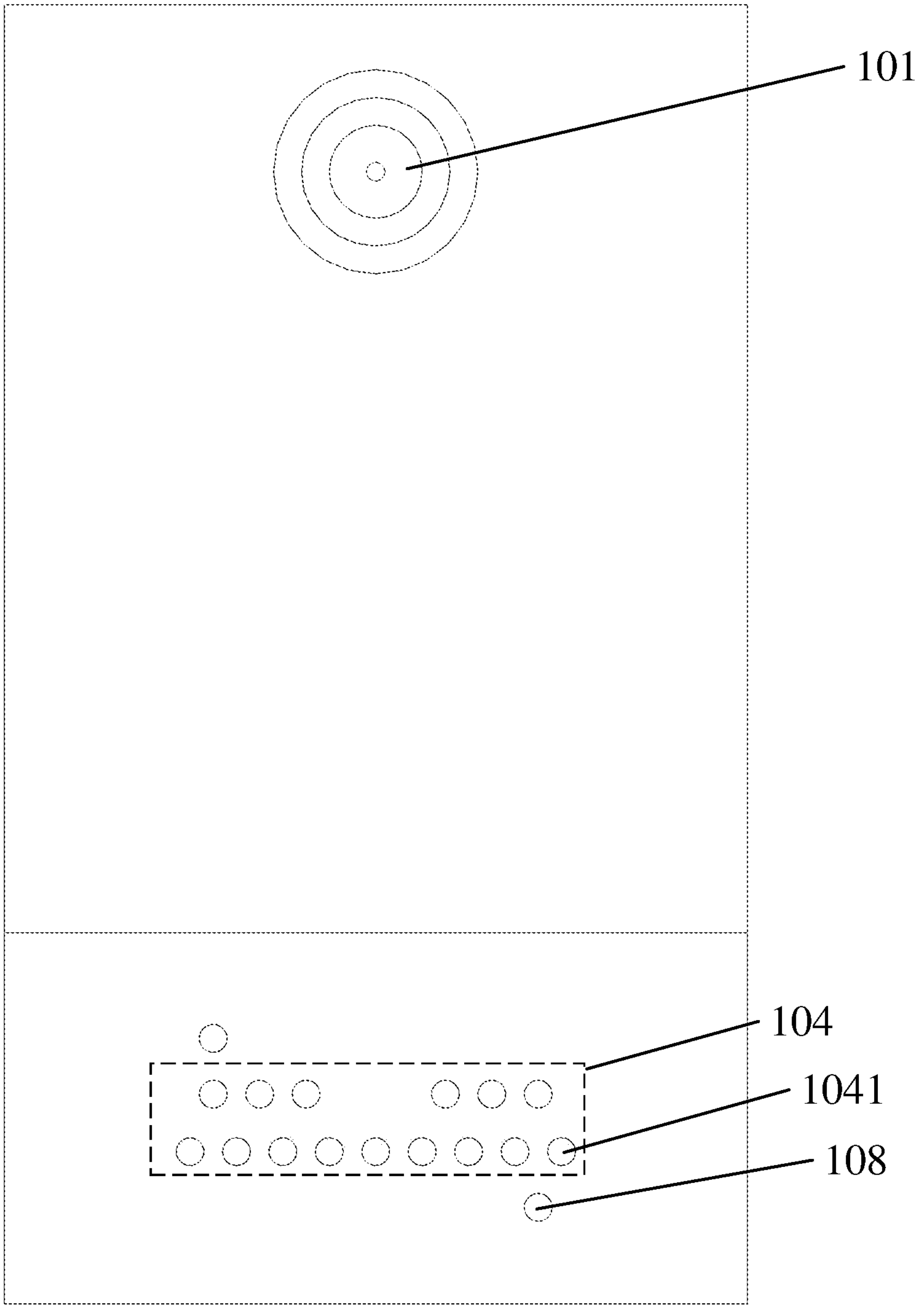
FIG. 5 is a schematic planar view of an upper surface of an upper substrate of a detection chip provided by at least one embodiment of the present disclosure.

For example, FIG. 2 illustrates a stereoscopic perspective view of the upper substrate 10 from the front side, FIG. 3 illustrates a stereoscopic perspective view of the upper substrate 10 from the back side, FIG. 4 illustrates a schematic planar view of a lower surface of the upper substrate 10, and FIG. 5 illustrates a schematic planar view of an upper surface of the upper substrate 10.

As illustrated in FIG. 2 to FIG. 5, the filter structure 103 of the detection chip may include a first main body 103A, and a first inlet portion 103B and a first outlet portion 103C respectively on two sides of the first main body 103A. With reference to FIG. 4, the width W2 of the first inlet portion 103B and the width W3 of the first outlet portion 103C gradually decrease in the direction away from the first main body 103A, and for example, the sides of the corresponding channels may be straight or curved (for example, hyperbolic, parabolic, or the like). For example, the height of the filter structure 103 (also referred to as the thickness or depth, that is, the size of the filter structure 103 in the direction perpendicular to the upper or lower surface of the upper substrate 10) may range from 0.2 mm to 1.5 mm, such as 0.5 mm, 1 mm, or the like, and the maximum width W1 of the first main body 103A may range from 6 mm to 15 mm, such as 8 mm, 10 mm, 13 mm, or the like.

In the embodiments of the present disclosure, the direction of a connection line from the inlet to the outlet of the filter structure 103 is referred to as the length direction (i.e., the vertical direction in FIG. 4) of the filter structure 103, the direction perpendicular to the length direction is referred to as the width direction (i.e., the horizontal direction in FIG. 4) of the filter structure 103, and the size of the filter structure 103 in the width direction is the width of the filter structure 103.

In the above-mentioned structure of the filter structure 103, the width W2 of the first inlet portion 103B and the width W3 of the first outlet portion 103C gradually decrease in the direction away from the first main body 103A, so as to guide the sample flowing into and out of the filter structure 103, thereby allowing the sample to thoroughly pass through the filter structure 103 and achieving filtration. Moreover, under the above-mentioned structure parameters of the filter structure 103, the filter structure 103 has sufficient filtration space to fully implement the filtration function.

For example, the detection chip further includes a filter film 1031, and the filter film 1031 is disposed in the filter structure 103. For example, the filter film 1031 is in a compressed state in the thickness direction, and the compression amount ranges from 10% to 40%, that is, the thickness of the filter film 1031 when disposed in the filter structure 103 is reduced by 10% to 40% compared to the thickness of the filter film 1031 in a relaxed state. Thus, the upper and lower surfaces of the filter film 1031 are in close contact with the upper and lower surfaces of the filter structure 103, respectively, so that the sample entering the filter structure 103 can thoroughly pass through the filter film 1031, while avoiding possible occurrence of the sample flowing through a gap between the filter film 1031 and the filter structure 103, so as to prevent the occurrence of blood leakage phenomenon.

For example, in some embodiments, the planar shape of the first main body 103A includes a curved edge. For example, with reference to FIG. 4, the planar shape of the first main body 103A includes two arc-shaped edges connecting the first inlet portion 103B and the first outlet portion 103C. For example, in other embodiments, the planar shape of the first main body 103A may also include edges in other shapes, such as wavy edges, zigzag edges, pointed edges protruding outward, rounded edges protruding outward, or the like. The planar shape of the first main body 103A may be determined according to actual needs.

For example, the planar shape of the first inlet portion 103B is an isosceles triangle, the first inlet portion 103B has an inlet at the apex of the isosceles triangle, and the first inlet portion 103B is connected to the first main body 103A at the bottom side of the isosceles triangle.

It should be noted that in the embodiments of the present disclosure, the planar shape of one structure refers to the shape of the orthographic projection of the structure, for example, on the lower surface of the upper substrate 10. For example, in a case where the planar shape of the first inlet portion 103B is an isosceles triangle, the shape of the orthographic projection of the first inlet portion 103B on the lower surface of the upper substrate 10 is an isosceles triangle, that is, the situation illustrated in FIG. 4.

For example, in a case where the planar shape of the first inlet portion 103B is an isosceles triangle, the apex angle of the isosceles triangle may range from 45° to 120°, such as 90°. Because the inlet of the filter structure 103 is at the position of the apex angle of the isosceles triangle, where the apex angle of the isosceles triangle ranges from 45° to 120°, the sample can uniformly enter the filter structure 103 along the edge of the first inlet portion 103B and uniformly pass through the filter film 1031 in the filter structure 103, so as to achieve a better filtering effect. Where the apex angle of the isosceles triangle is too large, the sample may be concentrated at the middle portion of the filter film 1031 and cannot uniformly pass through the filter film 1031. Where the apex angle of the isosceles triangle is too small, the sample may be concentrated in a small region, and in this case, part of the sample may easily flow through the edge of the filter film, resulting in blood leakage.

For example, in some embodiments, the planar shape of the first outlet portion 103B is a polygon, the first outlet portion 103B has an outlet at a corner of the polygon, and the first outlet portion 103B is connected to the first main body 103A at one side of the polygon.

In the above embodiments, the first inlet portion 103B can guide the sample entering from the inlet to allow the sample to uniformly flow into the filter structure 103, and make full use of the filter film 1031 in the filter structure 103 to achieve the filtering function and improve the filtering efficiency, thereby preventing sample leakage at the edge. In addition, the first outlet portion 103C can also guide the sample, so that the filtered sample may flow out from the outlet uniformly, and the polygonal structure of the first outlet portion 103C may also accommodate more sample to avoid concentration of the sample at the outlet. In addition, by arranging the first inlet portion 103B and the first outlet portion 103B respectively on two sides of the first main body 103A, the filter structure 103 can filter the sample in a lateral flow filtering manner. In this way, because the length of the filtering path of the sample is the lateral size (for example, the length dimension) of the filter film 1031, and the lateral size is much larger than the thickness of the filter film 1031, the sample can be sufficiently filtered, and the design also facilitates achieving thinness of the overall appearance of the detection chip.

For example, in some embodiments, as illustrated in FIG. 1 and FIG. 2, the sample injection structure 101 includes a sample injection cavity, and the sample injection cavity may have various shapes, such as a cylindrical shape, a prismatic shape, or the like. For example, the height of the sample injection cavity of the sample injection structure 101 (that is, the size of the sample injection cavity in the direction perpendicular to the upper or lower surface of the upper substrate 10) may range from 5 mm to 15 mm, such as 8 mm, 10 mm, 12 mm, etc., and the diameter of the cylindrical sample injection cavity may range from 5 mm to 15 mm, such as 8 mm, 10 mm, 12 mm, etc. Thus, the sample injection cavity can contain enough samples.

For example, the sample injection structure 101 may further include a reagent pool, and the reagent pool can be used to store the diluent or other reagents which allow the sample to be more suitable for detection. For example, the upper and lower sides of the reagent pool are respectively sealed with encapsulation layers, and for example, the upper surface encapsulation layer 1011 and the lower surface encapsulation layer 1012 in FIG. 1 are respectively used for sealing. The upper surface encapsulation layer 1011, the lower surface encapsulation layer 1012, and the sample injection cavity form the reagent pool together. For example, the upper surface encapsulation layer 1011 and the lower surface encapsulation layer 1012 may be made of materials such as aluminum foil, plastic, or the like, and may be formed on the upper and lower sides of the reagent pool by heat sealing, ultrasonic welding, etc., thereby forming a sealed reagent storage space. For example, the volume of the formed reagent pool may range from 100 μL to 600 μL, such as 300 μL or 400 μL, so that a certain amount of diluent or other reagents can be accommodated.

For example, in some embodiments, the required mixing ratio of the sample and the diluent is determined. In this case, the volume of the diluent in the reagent pool can be selected and adjusted to facilitate obtaining the required mixing ratio. For example, the sample amount obtained by the sample injection structure 101 is known, and therefore the volume of the diluent in the reagent pool can be selected to control the mixing ratio of the sample and the diluent, so as to achieve quantification of the sample and obtain a sample with a certain concentration.

For example, in some embodiments, the detection chip further includes a mixing structure 102 and a first flow channel 106, the mixing structure 102 is connected between the sample injection structure 101 and the filter structure 103 through the first flow channel 106, and the mixing structure 102 can be used for mixing the sample and the diluent.

For example, with reference to FIG. 4, the mixing structure 102 includes a second main body 102A, and a second inlet portion 102B and a second outlet portion 102C respectively on two sides of the second main body 102A. The width W6 of the second inlet portion 102B and the width W7 of the second outlet portion 102C gradually decrease in the direction away from the second main body 102A. Similarly, for example, the sides of the corresponding channel may be straight or curved (for example, hyperbolic, parabolic, etc.), so as to facilitate uniform inflow and outflow of the sample and the diluent.

In the embodiments of the present disclosure, the direction of a connection line from the inlet to the outlet of the mixing structure 102 is referred to as the length direction (i.e., the horizontal direction in FIG. 4) of the mixing structure 102, the direction perpendicular to the length direction is referred to as the width direction (i.e., the vertical direction in FIG. 4) of the mixing structure 102, the size of the mixing structure 102 in the length direction is the length of the mixing structure 102, and the size of the mixing structure 102 in the width direction is the width of the mixing structure 102.

For example, in some examples, the planar shape of the mixing structure 102 may be a rhombus, a combination of a rectangle and a triangle, or the like. For example, in the example illustrated in FIG. 1 to FIG. 4, the planar shape of the second main body 102A of the mixing structure 102 is a rectangle, the planar shape of the second inlet portion 102B and the planar shape of the second outlet portion 102C are triangles, such as isosceles triangles, and the bottom sides of the triangles are connected to the rectangle. The second inlet portion 102B and the second outlet portion 102C provide guiding function, thereby facilitating the uniform inflow and outflow of the sample and the diluent.

For example, in some examples, the height of the mixing structure 102 (that is, the size of the mixing structure 102 in the direction perpendicular to the upper or lower surface of the upper substrate 10) may range 0.5 mm to 2 mm, such as 1 mm, 1.5 mm, or the like, the length L1 of the mixing structure 102 may range from 5 mm to 25 mm, such as 15 mm, 20 mm, or the like, and the width W5 of the mixing structure 102 may range from 1.5 mm to 5.5 mm, such as 2.5 mm, 3.5 mm, or the like. For example, the volume of the formed mixing structure 102 may range 100 μL to 600 μL, such as 300 μL or 400 μL. Thus, the formed mixing space can fully achieve the uniform mixing of the sample and the diluent.

For example, in some embodiments, the detection chip further includes a second flow channel 105 connecting the sample injection structure 101 and the mixing structure 102. For example, the height of the second flow channel 105 (that is, the size of the second flow channel 105 in the direction perpendicular to the upper or lower surface of the upper substrate 10) may range from 0.2 mm to 1 mm, such as 0.5 mm, 0.8 mm, or the like, and the width of the second flow channel 105 (that is, the size of the second flow channel 105 in the direction perpendicular to the extending direction of the second flow channel 105) may range from 0.2 mm to 1 mm, such as 0.5 mm, 0.8 mm, or the like. The arrangement of the second flow channel 105 facilitates the mixing operation.

For example, an exemplary operation process of the sample injection operation and the mixing operation performed in the sample injection structure 101 and the mixing structure 102 may be as follows. First, the upper surface encapsulation layer 1011 of the reagent pool can be pierced with a tool such as a dropper or a sampling needle, and then the sample is added to the reagent pool, so that the sample and the diluent in the reagent pool are initially mixed. Then, the lower surface encapsulation layer 1012 of the reagent pool is pierced with the tool such as a dropper or a sampling needle, so that the mixture of the sample and the diluent enters the mixing structure 102 through the second flow channel 105. For example, a tool such as a rubber stopper can be used to perform a pressing operation on the upper surface of the sample injection cavity of the sample injection structure 101, for example, perform a plurality of pressing operations, so that the mixture of the sample and the diluent can flow back and forth between the reagent pool and the mixing structure 102 through the second flow channel 105 to allow the sample to be thoroughly mixed with the diluent. After the mixing operation, the mixture can flow into the filter structure 103 through the first flow channel 106.

For example, in some embodiments, the filter structure 103 further includes a groove 1032 at least partially located at the first inlet portion 103B. For example, the height of the groove 1032 (that is, the size of the groove 1032 in the direction perpendicular to the upper or lower surface of the upper substrate 10) is greater than the height of the filter structure 103 by 0.2 mm to 1 mm, such as 0.5 mm That is, the height of the groove 1032 protruding from the filter structure 103 is 0.2 mm to 1 mm With reference to FIG. 2, the lower surface of the upper substrate 10 is used as a reference, the height of the groove 1032 relative to the lower surface of the upper substrate 10 is greater than the height of the filter structure 103 relative to the lower surface of the upper substrate 10 by 0.2 mm to 1 mm. For example, the mixing structure 102 and the groove 1032 are connected through the first flow channel 106. Therefore, the mixture of the sample and the diluent that is uniformly mixed can first enter the groove 1032 through the first flow channel 106. The groove 1032 can accommodate a certain amount of the mixture flowing from the mixing structure 102 to avoid the mixture from accumulating or even clogging at the inlet of the filter structure 103.

For example, in some embodiments, the planar shape of the groove 1032 may be a circle, an ellipse, or a modified shape of a circle or an ellipse, such as a water drop shape illustrated in the figure. For example, the width W4 of the groove 1032 may range from 1.5 mm to 5 mm, such as 2.5 mm or 3.5 mm, and the distance between the edge (for example, any point of the edge) of the groove 1032 and the edge (for example, any point of the edge) of the filter structure 103 may range from 1 mm to 3 mm, such as 1.5 mm or 2.5 mm.

For example, in some embodiments, the first flow channel 106 may be regionally designed to improve the transmission effect of the first flow channel 106 on the mixture. For example, in some examples, the first flow channel 106 includes a first portion 106A and a second portion 106B, the first portion 106A extends into the first inlet portion 103A of the filter structure 103 to be connected to the groove 1032, and the second portion 106B is between the mixing structure 102 and the filter structure 103. For example, the height of the first portion 106A is greater than the height of the second portion 106B.

For example, in some examples, the height of the groove 1032 is the same as the height of the first portion 106A, so as to facilitate the connection between the groove 1032 and the first portion 106A and facilitate the mixture rapidly flowing into the filter structure 103, thereby preventing the mixture from clogging at the inlet of the filter structure 103 and avoiding sample leakage at the edge.

For example, in some examples, the height of the first portion 106A may range from 0.5 mm to 1.5 mm, such as 1 mm or 1.2 mm, and the width of the first portion 106A may range from 0.2 mm to 1 mm, such as 0.5 mm or 0.8 mm. The height of the second portion 106B may range from 0.2 mm to 1 mm, such as 0.5 mm or 0.8 mm, and the width of the second portion 106B may range from 0.2 mm to 1 mm, such as 0.5 mm or 0.8 mm.

For example, in some examples, the height of the mixing structure 102 may be greater than the height of the second portion 106B of the first flow channel 106. Thus, the second portion 106B of the first flow channel 106 can play a bubble barrier or bubble destroying function at the outlet of the mixing structure 102 to eliminate bubbles which may exist in the mixture of the sample and the diluent, for example, to eliminate bubbles which may be generated during the back-and-forth flow of the mixture. In addition, the first flow channel 106 also has a buffering effect, which can prevent the mixture of the sample and the diluent from entering the filter structure 103 before being fully mixed.

For example, in some embodiments, the detection chip may further include a third flow channel 107 connecting the filter structure 103 and the reaction structure 104, and the mixture filtered through the filter structure 103 may enter the reaction structure 104 through the third flow channel 107. For example, the height of the third flow channel 107 may range from 0.2 mm to 1 mm, such as 0.5 mm or 0.8 mm, and the width of the third flow channel 107 may range from 0.2 mm to 1 mm, such as 0.5 mm or 0.8 mm Therefore, the mixture can have a suitable flowing speed and flow amount in the third flow channel 107.

For example, in some embodiments, the reaction structure 104 includes a plurality of reaction units 1041 (fourteen reaction units 1041 are illustrated in the figure), and each reaction unit 1041 includes a cylindrical cavity. For example, the diameter of the cylindrical cavity may range from 0.5 mm to 3 mm, such as 1.5 mm or 2 mm, and the height of the cylindrical cavity may range from 0.5 mm to 5 mm, such as 2 mm or 4 mm. For example, the cylindrical cavity contains the reaction reagent, such as the lyophilized reagent which is processed by a lyophilized method. After the mixture of the sample and the diluent reacts with the reaction reagent, the detection can be performed, and for example, optical detection or the like can be performed. For example, the types of reaction reagents in the plurality of reaction units 1041 may be different, so that the plurality of reaction units 1041 can be used to detect various indexes of the sample.

For example, in some examples, the reaction reagent in the cylindrical cavity may be a color reagent, and the color reagent is in the form of a solution in the cylindrical cavity, or the color reagent is dispersed in a detection film. For example, the mixture of the sample and the diluent can infiltrate into the reaction detection film and react with the color reagent dispersed in the detection film. After the reaction, the color of the detection film may change. In this way, the detection result of the sample can be obtained by detecting the color change of the detection film, and for example, detecting whether the sample contains a certain component, the content of the component, or the like.

For example, the above detection may be performed by an optical detection device. For example, the optical detection device may include a light source and a photodiode. In this case, the optical detection can be realized by the principle of light transmission or the principle of light reflection. For example, in a case where the principle of light transmission is used for detection, the light source of the optical detection device can illuminate the detection film in the cylindrical cavity or the solution after the reaction of the sample and the color reagent above the reaction unit 1041, and the photodiode of the optical detection device receives the light transmitted through the detection film or the solution after the reaction of the sample and the color reagent below the reaction unit 1041. By comparing the intensity of the light transmitted through the detection film or the solution after the reaction of the sample and the color reagent with the intensity of the light emitted by the light source, the light transmittance or light absorption rate of the detection film or the solution after the reaction of the sample and the color reagent can be obtained, thereby determining whether the sample contains a certain component, the content of the component, or the like. For example, in a case where the principle of light reflection is used for detection, the light source of the optical detection device can illuminate the detection film in the cylindrical cavity above the reaction unit 1041, and the photodiode of the optical detection device receives the light reflected by the detection film above the reaction unit 1041 as well. By comparing the intensity of the light reflected by the detection film with the intensity of the light emitted by the light source, the light reflectivity of the detection film can be obtained, thereby determining whether the sample contains a certain component, the content of the component, or the like.

For example, in some embodiments, the reaction structure 104 may further include a fourth flow channel 1042. The fourth flow channel 1042 includes a fourth main flow channel 1042A and a plurality of fourth sub-flow channels 1042B connected to at least one side of the fourth main flow channel 1042A (connected to two sides of the fourth main flow channel 1042A illustrated in the figure), the plurality of fourth sub-flow channels 1042B are connected to the plurality of reaction units 1041, respectively, and the third flow channel 107 is connected to the fourth main flow channel 1042A. Thus, the mixture can flow into the fourth main flow channel 1042A through the third flow channel 107, and then flow into the plurality of reaction units 1041 from the fourth main flow channel 1042A through the plurality of fourth sub-flow channels 1042B, respectively.

For example, the extending direction (i.e., the horizontal direction illustrated in the figure) of the fourth main flow channel 1042A is perpendicular to the extending direction (i.e., the vertical direction illustrated in the figure) of the third flow channel 107, and the third flow channel 107 is connected to a middle portion of the fourth main flow channel 1042A. In this way, the plurality of fourth sub-flow channels 1042B are uniformly distributed on two sides of the fourth main flow channel 1042A, which facilitates the uniform flow of the mixture into the plurality of reaction units 1041.

For example, the reaction structure 104 may further include an air-exhaust hole 1043 arranged in parallel with the plurality of reaction units 1041. In a case where the mixture enters the reaction units 1041, the air-exhaust hole 1043 facilitates exhausting excess air.

For example, the reaction units 1041 and the air-exhaust hole 1043 are through holes which penetrate the upper substrate 10, and the upper and lower surfaces of the reaction units 1041 and the upper and lower surfaces of the air-exhaust hole 1043 are sealed by the cover plate 30 and the lower substrate 20, respectively.

For example, in some embodiments, the detection chip may further include an air-exhaust liquid-barrier film 110, the air-exhaust liquid-barrier film 110 is disposed between the reaction structure 104 and the cover plate 30, and the air-exhaust liquid-barrier film 110 includes through holes at least exposing the plurality of reaction units 1041. For example, in a case where the mixture flows into the reaction units 1041, the pressure in the reaction units 1041 increases. The air-exhaust liquid-barrier film 110 can exhaust the excess air in the reaction units 1041 to balance the air pressure, and the air-exhaust liquid-barrier film 110 has functions of air permeation and liquid non-permeation, thereby preventing the sample from flowing out of the reaction units 1041.

Figure 6:
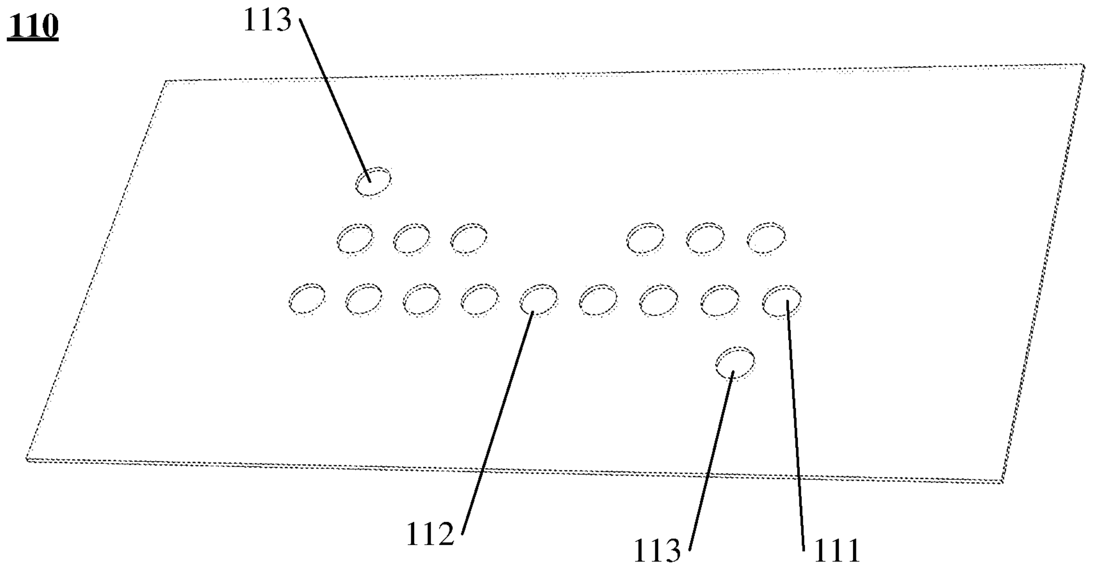
FIG. 6 is a schematic diagram of an air-exhaust liquid-barrier film of a detection chip provided by at least one embodiment of the disclosure.

For example, FIG. 6 illustrates a schematic diagram of an air-exhaust liquid-barrier film. As illustrated in FIG. 6, the air-exhaust liquid-barrier film 110 includes a plurality of through holes 111 corresponding to the reaction units 1041, and includes a through hole 112 corresponding to the air-exhaust hole 1043.

For example, in some embodiments, as illustrated in FIG. 2, the upper surface of the upper substrate 10 further includes positioning holes 108 for positioning. For example, the positioning holes 108 may be non-through holes, as long as the positioning function can be achieved. In this way, as illustrated in FIG. 1 and FIG. 6, the air-exhaust liquid-barrier film 110 may further include through holes 113 corresponding to the positioning holes. For example, as illustrated in FIG. 1, the cover plate 30 further includes fixing holes 301 corresponding to the positioning holes 108. Thus, the positioning holes 108 of the upper substrate 10, the through holes 113 of the air-exhaust liquid-barrier film 110, and the fixing holes 301 of the cover plate 30 can be aligned to achieve the positioning of the upper substrate 10, the air-exhaust liquid-barrier film 110, and the cover plate 30, and then bolts or other components may be used for fixing.

For example, in some examples, the air-exhaust liquid-barrier film 110 may be made of hydrophobic expanded polytetrafluoroethylene (ePTFE). The embodiments of the present disclosure do not limit the material of the air-exhaust liquid-barrier film 110, as long as the functions of air exhausting and liquid barrier can be achieved. For example, under the above arrangement of the air-exhaust liquid-barrier film 110, the air-exhaust liquid-barrier film 110 can achieve the effect of laterally air exhausting and liquid barrier.

For example, in some embodiments, the upper substrate 10 and the lower substrate 20 may be combined by an adhesive layer 201, such as combined by a double-sided tape, or combined by laser welding, ultrasonic welding, etc. For example, the upper substrate 10 and the lower substrate 20 may be made of materials with high light transmittance, such as polycarbonate (PC), polystyrene (PS), polymethyl methacrylate (PMMA), glass, or the like. The embodiments of the present disclosure do not specifically limit the material and connection method of each structure of the detection chip.

For example, in other embodiments, the arrangement of the sample injection structure 101, the mixing structure, the filter structure 103, the reaction structure 104, and the flow channels may be adjusted according to requirements. For example, some of the structures of the sample injection structure 101, the mixing structure, the filter structure 103, the reaction structure 104, and the flow channels may be formed on the upper substrate 10, and others may be formed on the lower substrate 20. Moreover, these structures may be formed on the upper surface or lower surface of each substrate according to requirements, that is, in addition to the case illustrated in FIG. 1 to FIG. 5, the arrangement of the sample injection structure 101, the mixing structure, the filter structure 103, the reaction structure 104, and the flow channels on the upper substrate 10 and the lower substrate 20 and arrangement positions may also adopt other manners.

For example, in some examples, the sample injection structure 101 penetrates the upper substrate 10, the second flow channel 105 and the mixing structure 102 are formed on the lower surface of the upper substrate 10, the first flow channel 106, the filter structure 103, and the third flow channel 107 are formed on the upper surface of the lower substrate 20, the reaction structure 104 penetrates the lower substrate 20, the upper surface of the reaction structure 104 is sealed by the upper substrate 10 or an additional upper cover plate, and the lower surface of the reaction structure 104 is sealed by an additional lower cover plate.

Alternatively, in other examples, the sample injection structure 101 penetrates the upper substrate 10, the second flow channel 105, the mixing structure 102, the first flow channel 106, the filter structure 103, and the third flow channel 107 are formed on the upper surface of the lower substrate 20 and sealed by the upper substrate 10 or an additional upper cover plate, the reaction structure 104 penetrates the lower substrate 20, the upper surface of the reaction structure 104 is sealed by the upper substrate 10 or an additional upper cover plate, and the lower surface of the reaction structure 104 is sealed by an additional lower cover plate.

The embodiments of the present disclosure do not limit the arrangement of each structure of the detection chip, as long as the arrangement and connection of each structure can be achieved and the corresponding function can be achieved.

The following statements should be noted.

(1) The accompanying drawings involve only the structure(s) in connection with the embodiment(s) of the present disclosure, and other structure(s) can be referred to common design(s).

(2) For the purpose of clarity, in accompanying drawings for illustrating the embodiment(s) of the present disclosure, the thickness of a layer or a region may be enlarged or narrowed, that is, the drawings are not drawn in a real scale.

(3) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

What is claimed is:

1. A detection chip, comprising a sample injection structure, a filter structure, and a reaction structure which are sequentially connected, wherein the reaction structure includes a reaction reagent to interact with a sample injected through the sample injection structure, wherein the filter structure comprises a first main body, and a first inlet portion and a first outlet portion respectively on two sides of the first main body, a width of the first inlet portion gradually decreases in a direction away from the first main body, and a width of the first outlet portion gradually decreases in a direction away from the first main body;

the detection chip further comprises a filter film, the filter film is in the filter structure, the detection chip further comprises a mixing structure defining a mixing chamber, the mixing structure is connected between the sample injection structure and the filter structure, the filter structure further comprises a groove at the first inlet portion, and a height of the groove is greater than a height of the filter structure by 0.2 mm to 1 mm, such that the groove protrudes from the filter structure, the detection chip further comprises a first flow channel, the mixing structure is connected to the groove through the first flow channel, the first flow channel comprises a first portion and a second portion, the first portion extends into the first inlet portion of the filter structure to be connected to the groove, the second portion is between the mixing structure and the filter structure, and a height of the first portion is greater than a height of the second portion.

2. The detection chip according to claim 1, wherein a height of the filter structure ranges from 0.2 mm to 1.5 mm, and a maximum width of the first main body ranges from 6 mm to 15 mm.

3. The detection chip according to claim 1, wherein a planar shape of the first main body comprises an arc-shaped edge, a planar shape of the first inlet portion is an isosceles triangle, and the first inlet portion has an inlet at an apex of the isosceles triangle.

4. The detection chip according to claim 3, wherein an apex angle of the isosceles triangle ranges from 45° to 120°.

5. The detection chip according to claim 3, wherein a planar shape of the first outlet portion is a polygon, and the first outlet portion has an outlet at a corner of the polygon.

6. The detection chip according to claim 1, wherein a width of the groove ranges from 1.5 mm to 5 mm, and a distance between an edge of the groove and an edge of the filter structure ranges from 1 mm to 3 mm.

7. The detection chip according to claim 1, wherein the height of the first portion ranges from 0.5 mm to 1.5 mm, and a width of the first portion ranges from 0.2 mm to 1 mm; and the height of the second portion ranges from 0.2 mm to 1 mm, and a width of the second portion ranges from 0.2 mm to 1 mm;

the height of the groove is identical to the height of the first portion.

8. The detection chip according to claim 1, wherein the mixing structure comprises a second main body, and a second inlet portion and a second outlet portion respectively on two sides of the second main body, a width of the second inlet portion gradually decreases in a direction away from the second main body, and a width of the second outlet portion gradually decreases in a direction away from the second main body.

9. The detection chip according to claim 1, wherein a height of the mixing structure ranges from 0.5 mm to 2 mm, a length of the mixing structure ranges from 5 mm to 25 mm, and a width of the mixing structure ranges from 1.5 mm to 5.5 mm;

the height of the mixing structure is greater than the height of the second portion of the first flow channel.

10. The detection chip according to claim 7, wherein the filter film is in a compressed state in a thickness direction, and a compression amount ranges from 10% to 40%.

11. The detection chip according to claim 1, further comprising a second flow channel connecting the sample injection structure to the mixing structure, wherein a height of the second flow channel ranges from 0.2 mm to 1 mm, and a width of the second flow channel ranges from 0.2 mm to 1 mm; and a height of the sample injection structure ranges from 5 mm to 15 mm, and a diameter of the sample injection structure ranges from 5 mm to 15 mm.

12. The detection chip according to claim 1, wherein the reaction structure comprises a plurality of reaction units, each of the plurality of reaction units comprises a cylindrical cavity, a diameter of the cylindrical cavity ranges from 0.5 mm to 3 mm, and a height of the cylindrical cavity ranges from 0.5 mm to 5 mm.

13. The detection chip according to claim 12, further comprising a third flow channel connecting the filter structure to the reaction structure, a height of the third flow channel ranges from 0.2 mm to 1 mm, and a width of the third flow channel ranges from 0.2 mm to 1 mm.

14. The detection chip according to claim 13, wherein the reaction structure comprises a fourth flow channel, the fourth flow channel comprises a fourth main flow channel and a plurality of fourth sub-flow channels connected to at least one side of the fourth main flow channel, the plurality of fourth sub-flow channels are connected to the plurality of reaction units, respectively, and the third flow channel is connected to the fourth main flow channel.

15. The detection chip according to claim 14, wherein an extending direction of the fourth main flow channel is perpendicular to an extending direction of the third flow channel, and the third flow channel is connected to a middle portion of the fourth main flow channel.

16. The detection chip according to claim 1, further comprising a cover plate and an air-exhaust liquid-barrier film, wherein the cover plate at least covers the reaction structure, and the air-exhaust liquid-barrier film is between the reaction structure and the cover plate, and comprises through holes at least exposing a plurality of reaction units.

* * * * *